United States Patent
Matsuhara et al.

(10) Patent No.: US 11,264,604 B2
(45) Date of Patent: Mar. 1, 2022

(54) NEGATIVE ELECTRODE MATERIAL, LITHIUM ION SECONDARY BATTERY, METHOD OF MANUFACTURING NEGATIVE ELECTRODE MATERIAL

(71) Applicant: TOYOTA JIDOSHA KABUSHIKI KAISHA, Toyota (JP)

(72) Inventors: Shinsuke Matsuhara, Miyoshi (JP); Kazuhisa Takeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 16/135,268

(22) Filed: Sep. 19, 2018

(65) Prior Publication Data

US 2019/0115588 A1    Apr. 18, 2019

(30) Foreign Application Priority Data

Oct. 18, 2017    (JP) .............................. JP2017-201672

(51) Int. Cl.
| | |
|---|---|
| *H01M 4/1391* | (2010.01) |
| *H01M 10/0525* | (2010.01) |
| *H01M 4/04* | (2006.01) |
| *H01M 4/133* | (2010.01) |
| *H01M 4/1393* | (2010.01) |
| *H01M 4/48* | (2010.01) |
| *H01M 4/36* | (2006.01) |
| *H01M 4/587* | (2010.01) |
| *H01M 4/02* | (2006.01) |

(52) U.S. Cl.
CPC ....... *H01M 4/1391* (2013.01); *H01M 4/0471* (2013.01); *H01M 4/133* (2013.01); *H01M 4/1393* (2013.01); *H01M 4/364* (2013.01); *H01M 4/48* (2013.01); *H01M 4/483* (2013.01); *H01M 4/587* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 2004/0219424 A1* | 11/2004 | Kanno | ................... | H01M 4/62 429/137 |
| 2009/0011333 A1 | 1/2009 | Wakita et al. | | |
| 2011/0281180 A1 | 11/2011 | Kim et al. | | |

(Continued)

FOREIGN PATENT DOCUMENTS

| | | |
|---|---|---|
| CN | 101425580 A | 5/2009 |
| JP | 2009-016245 A | 1/2009 |

(Continued)

*Primary Examiner* — Nathanael T Zemui
(74) *Attorney, Agent, or Firm* — Sughrue Mion, PLLC

(57) ABSTRACT

A negative electrode material includes at least a graphite particle and a first metal oxide. The graphite particle includes at least one open pore. The graphite particle has a porosity not lower than 13% and not higher than 66%. The first metal oxide adheres to an inner wall of the open pore. The first metal oxide is lithium ion conductive and electron conductive. The first metal oxide is not smaller than 0.5 part by mass and not greater than 20 parts by mass with respect to 100 parts by mass of graphite particle.

19 Claims, 4 Drawing Sheets

(56) References Cited

U.S. PATENT DOCUMENTS

| | | | |
|---|---|---|---|
| 2013/0122369 A1* | 5/2013 | Kim | H01M 4/38 |
| | | | 429/219 |
| 2013/0266858 A1 | 10/2013 | Inoue et al. | |
| 2014/0113200 A1* | 4/2014 | Seymour | H01G 11/38 |
| | | | 429/231.8 |
| 2015/0086840 A1 | 3/2015 | Takami et al. | |
| 2015/0221940 A1* | 8/2015 | Shimonishi | H01M 4/5825 |
| | | | 429/220 |
| 2015/0243969 A1* | 8/2015 | Ku | H01M 10/052 |
| | | | 429/231.5 |
| 2015/0325855 A1* | 11/2015 | Kawakami | G06F 1/1626 |
| | | | 361/679.55 |
| 2016/0099463 A1 | 4/2016 | Lee et al. | |
| 2016/0207789 A1* | 7/2016 | Tang | H01M 4/0402 |
| 2017/0062871 A1* | 3/2017 | Urata | H01M 4/485 |
| 2017/0170515 A1* | 6/2017 | Yushin | H01M 10/054 |
| 2017/0294687 A1* | 10/2017 | Burshtain | H01M 4/386 |
| 2018/0005771 A1* | 1/2018 | Lee | C01G 23/053 |
| 2018/0248175 A1* | 8/2018 | Ghezelbash | H01M 4/364 |

FOREIGN PATENT DOCUMENTS

| | | |
|---|---|---|
| JP | 2011243571 A | 12/2011 |
| JP | 2013232403 A | 11/2013 |
| JP | 2014022041 A | 2/2014 |
| JP | 2015060824 A | 3/2015 |
| JP | 2016-076487 A | 5/2016 |
| WO | 2015/129188 A1 | 9/2015 |

\* cited by examiner

NEGATIVE ELECTRODE MATERIAL, LITHIUM ION SECONDARY BATTERY, METHOD OF MANUFACTURING NEGATIVE ELECTRODE MATERIAL

This nonprovisional application is based on Japanese Patent Application No. 2017-201672 filed with the Japan Patent Office on Oct. 18, 2017, the entire contents of which are hereby incorporated by reference.

BACKGROUND

Field

The present disclosure relates to a negative electrode material, a lithium ion secondary battery, and a method of manufacturing a negative electrode material.

Description of the Background Art

International Publication WO2015/129188 discloses adhesion of a tungsten compound to a surface of a graphite particle.

SUMMARY

For example, a metal oxide which is lithium ion conductive and electron conductive, such as tungsten oxide (VI), has been found. It is expected that adhesion of the metal oxide to a surface of a graphite particle (a negative electrode active material) promotes diffusion of lithium (Li) ions at the surface of the graphite particle and a resistance of a battery is lowered.

It has newly been found, however, that a resistance of a battery during current applying (which is also denoted as a "current applying resistance" below) has not much been lowered. This may be because diffusion of Li ions is active at the surface of the graphite particle whereas Li ions do not sufficiently diffuse into the inside of the graphite particle.

An object of the present disclosure is to lower a current applying resistance.

Technical features and functions and effects of the present disclosure will be described below. A functional mechanism of the present disclosure, however, includes presumption. The scope of claims should not be limited by whether or not the functional mechanism is correct.

[1] A negative electrode material according to the present disclosure is for a lithium ion secondary battery. The negative electrode material includes at least a graphite particle and a first metal oxide. The graphite particle includes at least one open pore. The graphite particle has a porosity not lower than 13% and not higher than 66%. The first metal oxide is lithium ion conductive and electron conductive. The first metal oxide adheres to an inner wall of the open pore. The first metal oxide is not smaller than 0.5 part by mass and not greater than 20 parts by mass with respect to 100 parts by mass of the graphite particle.

In the negative electrode material in the present disclosure, the graphite particle includes open pores. The open pores refer to pores which communicate with the outside of a particle. The first metal oxide is lithium ion conductive and electron conductive. The first metal oxide adheres to the inner wall of the open pore. Therefore, promotion of diffusion of Li ions into the inside of the graphite particle is expected. Lowering in current applying resistance is thus expected.

The graphite particle has a porosity not lower than 13% and not higher than 66%. When the porosity is lower than 13%, it may be difficult to adhere the first metal oxide to the inner wall of the open pore. When the porosity exceeds 66%, an amount of lowering in current applying resistance tends to be small. This may be because the graphite particle is likely to break when an electrode is compressed.

The first metal oxide is not smaller than 0.5 part by mass and not greater than 20 parts by mass with respect to 100 parts by mass of graphite particles. When the first metal oxide is smaller than 0.5 part by mass, an amount of lowering in current applying resistance tends to be small. When the first metal oxide exceeds 20 parts by mass, a current applying resistance may increase to the contrary, which may be because of decrease in effective area of reaction due to a reaction site of graphite being covered with the first metal oxide.

[2] The first metal oxide may be, for example, tungsten oxide (VI). Tungsten oxide (VI) may be lithium ion conductive and electron conductive.

[3] The negative electrode material may further include a second metal oxide. The second metal oxide is an insulator. The second metal oxide adheres to an outer surface of the graphite particle.

By applying a negative electrode composite material containing the negative electrode material to a surface of a negative electrode current collector, a negative electrode composite material layer is formed. An electrode (negative electrode) can thus be manufactured. The negative electrode material in the present disclosure may be highly electron conductive. Therefore, the negative electrode composite material layer may be highly electron conductive over the entire region. The negative electrode material in the present disclosure may also be highly lithium ion conductive. At a position distant from an outermost surface of the negative electrode composite material layer in a direction from the outermost surface of the negative electrode composite material layer toward the negative electrode current collector (a direction of thickness of the negative electrode composite material layer), however, diffusion of Li ions may be delayed as compared with diffusion at the outermost surface. Consequently, a disadvantage as below may be caused. When a high current is applied, supply of electrons becomes excessive as compared with supply of Li ions, and hence Li (metal) may precipitate at the outermost surface of the negative electrode composite material layer.

According to the feature [3], suppression of precipitation of Li is expected. It may be because balance between lithium ion conductivity and electron conductivity is improved in the negative electrode composite material layer as a result of adhesion of the second metal oxide composed of an insulator to the outer surface of the graphite particle.

[4] The second metal oxide may be a ferroelectric. Lowering in current applying resistance is thus expected. This may be because acceptance of Li ions into the graphite particle is promoted owing to dielectric polarization of the ferroelectric.

[5] The second metal oxide may be at least one selected from the group consisting of aluminum oxide (III), silicon dioxide, and barium titanate. These metal oxides can have a suitable resistivity. Barium titanate is also a ferroelectric.

[6] A lithium ion secondary battery in the present disclosure contains at least the negative electrode material described in any one of [1] to [5]. The lithium ion secondary battery is expected to be low in current applying resistance.

[7] A method of manufacturing a negative electrode material in the present disclosure is a method of manufacturing a negative electrode material for a lithium ion secondary battery. The method includes at least (A) and (B) below:

(A) Preparing graphite particles each including at least one open pore; and (B) Precipitating a first metal oxide on an inner wall of the open pore with a hydrothermal technique.

The graphite particle has a porosity not lower than 13% and not higher than 66%. The first metal oxide is lithium ion conductive and electron conductive. The first metal oxide is not smaller than 0.5 part by mass and not greater than 20 parts by mass with respect to 100 parts by mass of the graphite particles. According to the method, the negative electrode material including the feature [1] can be manufactured.

[8] The method of manufacturing a negative electrode material may further include (C) below:

(C) Adhering a second metal oxide to an outer surface of the graphite particle. The second metal oxide is an insulator. According to the method, a negative electrode material with the feature [3] can be manufactured.

[9] In the method of manufacturing a negative electrode material in [8], the second metal oxide may be a ferroelectric. According to the method, a negative electrode material with the feature [4] can be manufactured.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure (which is herein denoted as the "present embodiment") will be described below. The description below, however, does not limit the scope of claims.

<Negative Electrode Material>

Figure 1:
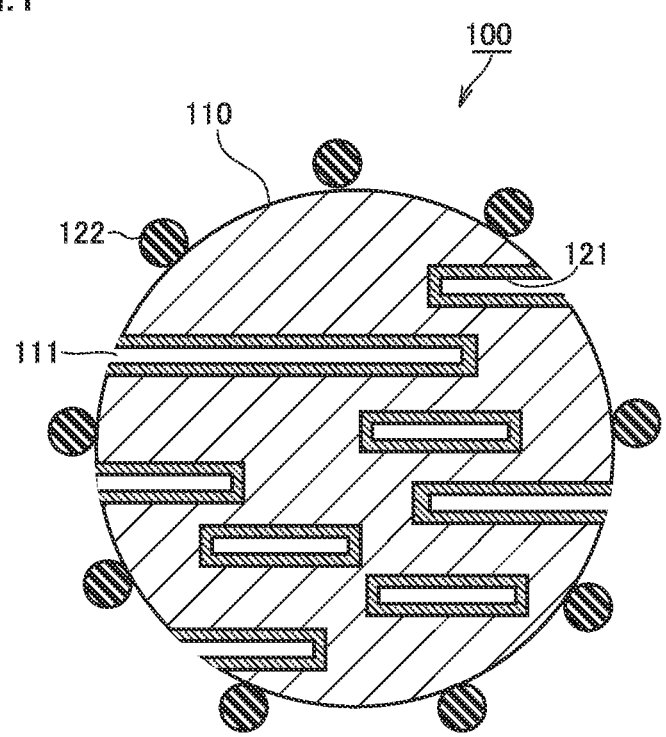
FIG. 1 is a conceptual cross-sectional view showing a negative electrode material in the present embodiment.

FIG. 1 is a conceptual cross-sectional view showing a negative electrode material in the present embodiment.

A negative electrode material 100 in the present embodiment is for a lithium ion secondary battery. Negative electrode material 100 includes at least a graphite particle 110 and a first metal oxide 121. Negative electrode material 100 may further include a second metal oxide 122 which will be described later.

«Graphite Particle»

Graphite particle 110 represents a negative electrode active material. Graphite particle 110 is also a base material for negative electrode material 100. Graphite particle 110 represents a particle containing at least graphite. Graphite particle 110 may contain also a carbon material similar to graphite (for example, soft carbon and hard carbon) so long as the graphite particle contains graphite. Graphite particle 110 may naturally be composed substantially of graphite alone.

Graphite particle 110 may have d50, for example, not smaller than 1 μm and not greater than 30 μm. d50 is measured with a laser diffraction/scattering method. d50 refers to a particle size at which a cumulative volume of particles from a finer side attains to 50% of the total volume of particles in a volume-based particle size distribution. d50 is measured at least three times. An arithmetic mean resulting from at least three times of measurement is adopted as a measurement result. Graphite particle 110 may have d50, for example, not smaller than 5 μm and not greater than 15 μm. A shape of graphite particle 110 should not particularly be limited. Graphite particle 110 may be in a form, for example, of a sphere, a lump, or a scale.

Graphite particle 110 includes at least one open pore 111. Open pore 111 is a pore which communicates with the outside of the particle. Presence of open pore 111 can be confirmed by observing a surface or a cross-section of graphite particle 110 with a scanning electron microscope (SEM). Graphite particle 110 may include a plurality of open pores. Graphite particle 110 may include, for example, two or more open pores. Graphite particle 110 may include, for example, ten or more open pores. Graphite particle 110 may include, for example, at most 100 open pores. Two or more open pores 111 may be connected to each other in the inside of graphite particle 110. Namely, graphite particle 110 may include a communicating pore.

Graphite particle 110 has a porosity not lower than 13% and not higher than 66%. The porosity represents a ratio of a volume of cavities in graphite particle 110. The porosity is measured with a general mercury porosimeter. The porosity is measured at least three times. An arithmetic mean of at least three times of measurement is adopted as a result of measurement. It may be difficult to adhere first metal oxide 121 to the inner wall of open pore 111 when the porosity is lower than 13%. When the porosity exceeds 66%, an amount of lowering in current applying resistance tends to be small, which may be because graphite particle 110 is likely to break when a negative electrode composite material layer 222 (which will be described later) is compressed.

Graphite particle 110 may have a porosity, for example, not lower than 13% and not higher than 39%. Graphite particle 110 may have a porosity, for example, not lower than 39% and not higher than 66%. Lowering in current applying resistance is expected within these ranges.

«First Metal Oxide»

First metal oxide 121 adheres to the inner wall of open pore 111. First metal oxide 121 is lithium ion conductive and electron conductive. Diffusion of Li ions into the inside of graphite particle 110 may be facilitated as a result of adhesion of first metal oxide 121 to the inner wall of open pore 111. Namely, lowering in current applying resistance is expected.

A form of first metal oxide 121 should not particularly be limited. First metal oxide 121 may be, for example, in a form of a film. First metal oxide 121 may be, for example, particulate. First metal oxide 121 may adhere to a part of the inner wall of open pore 111. First metal oxide 121 may adhere to the entire inner wall of open pore 111. Namely, first metal oxide 121 adheres to at least a part of the inner wall of open pore 111.

So long as first metal oxide 121 adheres to the inner wall of open pore 111, first metal oxide 121 may adhere also to the outer surface of graphite particle 110. First metal oxide 121 desirably adheres substantially only to the inner wall of open pore 111. It is considered that promotion of diffusion of Li ions into the inside of graphite particle 110 is facilitated as a result of adhesion of first metal oxide 121 substantially only to the inner wall of open pore 111.

Whether or not first metal oxide 121 adheres to the inner wall of open pore 111 can be confirmed, for example, by subjecting a cross-section of negative electrode material 100 to scanning electron microscope-energy dispersive X-ray analysis (SEM-EDX). Prior to analysis, a cross-section of negative electrode material 100 may be subjected to a cross-section polisher (CO) process or a focused ion beam (FIB) process.

Examples of a metal oxide with lithium ion conductivity and electron conductivity include tungsten oxide (VI) [$WO_3$], titanium oxide (IV) [$TiO_2$], niobium oxide (V) [$Nb_2O_5$], and molybdenum oxide (VI) [$MoO_3$]. One type of metal oxide alone may be used as first metal oxide 121. Two or more metal oxides as being combined may be used as first metal oxide 121. For example, first metal oxide 121 may be at least one selected from the group consisting of $WO_3$, $TiO_2$, $Nb_2O_5$, and $MoO_3$. First metal oxide 121 may be $WO_3$. $WO_3$ is expected to be highly lithium ion conductive and highly electron conductive. A composition of first metal oxide 121 can be identified, for example, with SEM-EDX described previously and X-ray diffraction (XRD).

First metal oxide 121 is not smaller than 0.5 part by mass and not greater than 20 parts by mass with respect to 100 parts by mass of graphite particle 110. When first metal oxide 121 is smaller than 0.5 part by mass, an amount of lowering in current applying resistance tends to be small. When first metal oxide 121 exceeds 20 parts by mass, a current applying resistance may increase to the contrary, which may be because of decrease in effective area of reaction.

First metal oxide 121 may be not smaller than 0.5 part by mass and not greater than 5 parts by mass with respect to 100 parts by mass of graphite particle 110. First metal oxide 121 may be, for example, not smaller than 5 part by mass and not greater than 20 parts by mass with respect to 100 parts by mass of graphite particle 110. Lowering in current applying resistance is expected within these ranges.

A part by mass of first metal oxide 121 is measured with inductively coupled plasma atomic emission spectrometry (ICP-AES). A part by mass of first metal oxide 121 is measured at least three times. An arithmetic mean resulting from at least three times of measurement is adopted as a measurement result. A sample for measurement with ICP can be prepared, for example, as below. Namely, 0.1 g of negative electrode material 100 is weighed. Negative electrode material 100 is heated in an electric furnace. Two grams of pyrosulfuric acid (disulfuric acid) are mixed with heated negative electrode material 100. The mixture is heated. Diluted hydrochloric acid is added to the heated mixture to obtain a constant volume of 100 ml. The sample for measurement with ICP can thus be prepared.

«Second Metal Oxide»

Negative electrode material 100 may further include second metal oxide 122. Second metal oxide 122 is an insulator. Second metal oxide 122 adheres to the outer surface of graphite particle 110. As a result of adhesion of second metal oxide 122 to the outer surface of graphite particle 110, suppression of precipitation of Li in a negative electrode 220 (which will be described later) is expected. This may be because of improvement in balance between lithium ion conductivity and electron conductivity in negative electrode composite material layer 222.

A form of second metal oxide 122 should not particularly be limited. Second metal oxide 122 may be, for example, in a form of a film. Second metal oxide 122 may be, for example, particulate. Second metal oxide 122 may adhere to a part of the outer surface of graphite particle 110. Second metal oxide 122 may adhere to the entire outer surface of graphite particle 110. Namely, second metal oxide 122 adheres to at least a part of the outer surface of graphite particle 110.

So long as second metal oxide 122 adheres to the outer surface of graphite particle 110, second metal oxide 122 may adhere also to the inner wall of open pore 111. Second metal oxide 122 desirably adheres substantially only to the outer surface of graphite particle 110. This is because adhesion of second metal oxide 122 to the inner wall of open pore 111 could block diffusion of Li ions into the inside of graphite particle 110.

The insulator in the present embodiment has a resistivity, for example, not lower than $10^{10}$ Ω·m. Namely, second metal oxide 122 may have a resistivity, for example, not lower than $10^{10}$ Ω·m. A value in a literature such as Kagaku Binran (Edited by The Chemical Society of Japan and published by Maruzen Publishing, Co., Ltd.) may be used as a resistivity. Second metal oxide 122 may have a resistivity, for example, not lower than $10^{14}$ Ω·m. Second metal oxide 122 may have a resistivity, for example, not higher than $10^{16}$ Ω·m. Examples of metal oxide which can have a resistivity not lower than $10^{10}$ Ω·m include aluminum oxide (III) [$Al_2O_3$] silicon dioxide ($SiO_2$), and barium titanate ($BaTiO_3$).

Second metal oxide 122 may be an insulator and ferroelectric. When second metal oxide 122 is a ferroelectric, lowering in current applying resistance is expected. This may be because acceptance of Li ions into graphite particle 110 is promoted as a result of dielectric polarization of the ferroelectric.

The ferroelectric in the present embodiment has a relative permittivity, for example, not lower than 100. Namely, second metal oxide 122 may have a relative permittivity, for example, not lower than 100. A relative permittivity is a value measured at a frequency of 1 MHz. A value in a literature such as Kagaku Binran (Edited by The Chemical Society of Japan and Published by Maruzen Publishing, Co., Ltd.) may be used as a relative permittivity. Examples of metal oxide which can have a relative permittivity not lower than 100 include $BaTiO_3$, strontium titanate ($SrTiO_3$), and lead zirconate titanate [$Pb(Zr, Ti)O_3$].

One type of metal oxide alone may be used as second metal oxide 122. Two or more types of metal oxides as being combined may be used as second metal oxide 122. Second metal oxide 122 may be at least one selected from the group consisting of $Al_2O_3$, $SiO_2$, and $BaTiO_3$. A composition of second metal oxide 122 can be identified, for example, with SEM-EDX and XRD described previously.

When second metal oxide 122 is excessively low in content, an effect of suppression of precipitation of Li can be low. When second metal oxide 122 is excessively high in content, electron conductivity can excessively be interfered. Second metal oxide 122 may be, for example, not smaller than 0.1 part by mass and not greater than 3 parts by mass with respect to 100 parts by mass of graphite particle 110. Second metal oxide 122 may be, for example, not smaller than 0.1 part by mass and not greater than 0.5 part by mass with respect to 100 parts by mass of graphite particle 110. Second metal oxide 122 may be, for example, not smaller than 0.5 part by mass and not greater than 3 parts by mass with respect to 100 parts by mass of graphite particle 110. An effect of suppression of precipitation of Li is expected to be high within these ranges.

A part by mass of second metal oxide 122 is measured with ICP-AES. A part by mass of second metal oxide 122 is measured at least three times. An arithmetic mean resulting from at least three times of measurement is adopted as a measurement result.

<Method of Manufacturing Negative Electrode Material>

Figure 2:
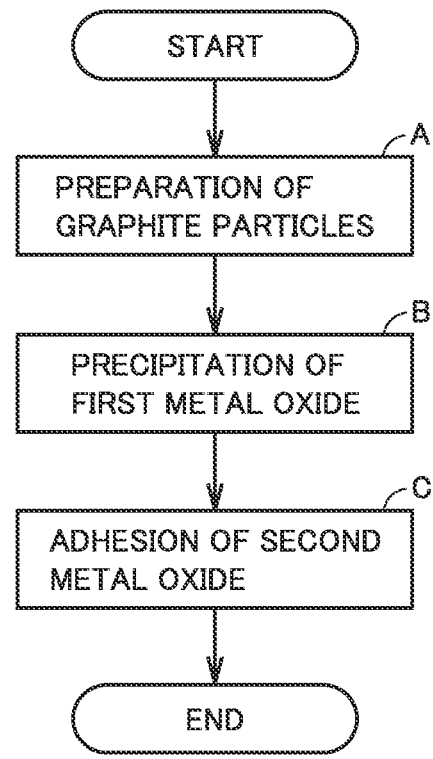
FIG. 2 is a flowchart showing overview of a method of manufacturing a negative electrode material in the present embodiment.

FIG. 2 is a flowchart showing overview of a method of manufacturing a negative electrode material in the present embodiment.

The method of manufacturing a negative electrode material in the present embodiment includes at least "(A) preparation of graphite particles" and "(B) precipitation of first metal oxide." The method of manufacturing a negative electrode material in the present embodiment may further include "(C) adhesion of second metal oxide."

《(A) Preparation of Graphite Particles》

The method of manufacturing a negative electrode material in the present embodiment includes preparing graphite particles 110 each including at least one open pore 111. Graphite particle 110 has a porosity not lower than 13% and not higher than 66%. Details of graphite particle 110 are as described previously. Graphite particles 110 may be synthesized. Graphite particles 110 may be purchased. Graphite particles 110 having a porosity not lower than 13% and not higher than 66% may be picked up.

《(B) Precipitation of First Metal Oxide》

The method of manufacturing a negative electrode material in the present embodiment includes precipitating first metal oxide 121 on the inner wall of open pore 111 with a hydrothermal technique. First metal oxide 121 is lithium ion conductive and electron conductive. Details of first metal oxide 121 are as described previously. First metal oxide 121 may be, for example, at least one selected from the group consisting of $WO_3$, $TiO_2$, $Nb_2O_5$, and $MoO_3$. First metal oxide 121 may be $WO_3$.

In the present embodiment, first metal oxide 121 can also be precipitated substantially only on the inner wall of open pore 111 by adopting the hydrothermal technique. By way of example, a manufacturing method when $WO_3$ is adopted as first metal oxide 121 is described.

Lithium tungstate ($Li_2WO_4$) is prepared as a precursor of $WO_3$. Lithium tungstate is dispersed in ion exchanged water. A dispersion liquid is thus prepared. The dispersion liquid is heated, for example, to approximately 50° C.

pH of the dispersion liquid is adjusted, for example, with an inorganic acid such as muriatic acid. A concentration of the inorganic acid may be set, for example, to approximately 4 mol/l. pH of the dispersion liquid can be adjusted, for example, to approximately at least 0.4 and at most 0.6 (for example, approximately 0.5).

A prescribed autoclave is prepared. The dispersion liquid and graphite particles 110 are introduced into the autoclave. An amount of introduction of the dispersion liquid and graphite particles 110 is adjusted such that first metal oxide 121 (in this example, $WO_3$) is not smaller than 0.5 part by mass and not greater than 20 parts by mass with respect to 100 parts by mass of graphite particle 110. After the dispersion liquid and graphite particles 110 are introduced, the autoclave is hermetically sealed.

An oil bath is prepared. A temperature of the oil bath can be set, for example, to a temperature approximately not lower than 140° C. and not higher than 180° C. (for example, a temperature approximately not lower than 150° C. and not higher than 170° C.). The temperature of the oil bath can be measured, for example, with a thermometer provided in the oil bath. The autoclave is stored in the oil bath, for example, approximately for at least one day and at most five days (for example, approximately three days). $WO_3$ can thus be precipitated on the inner wall of open pore 111.

It is considered that contents in the autoclave are heated to a temperature substantially as high as the temperature of the oil bath while they are stored in the oil bath. An internal pressure in the autoclave can be adjusted, for example, based on a temperature of the oil bath. An internal pressure in the autoclave can be, for example, not lower than 2 MPa and not higher than 10 MPa. The internal pressure in the autoclave can be measured, for example, with a manometer provided in the autoclave.

Therefore, the method of manufacturing a negative electrode material in the present embodiment may include precipitating first metal oxide 121 on the inner wall of open pore 111 at a temperature not lower than 140° C. and not higher than 180° C. with the hydrothermal technique. The method of manufacturing a negative electrode material in the present embodiment may include precipitating first metal oxide 121 on the inner wall of open pore 111 at a pressure not lower than 2 MPa and not higher than 10 MPa with the hydrothermal technique. The method of manufacturing a negative electrode material in the present embodiment may include precipitating first metal oxide 121 on the inner wall of open pore 111 at a temperature not lower than 140° C. and not higher than 180° C. and at a pressure not lower than 2 MPa and not higher than 10 MPa with the hydrothermal technique.

It is considered that, when a temperature of the oil bath is set, for example, to approximately 120° C., an internal pressure in the autoclave does not become sufficiently high and the dispersion liquid (a source material liquid of $WO_3$) does not permeate into the inside of graphite particle 110. Namely, it may be difficult to precipitate $WO_3$ on the inner wall of open pore 111.

《(C) Adhesion of Second Metal Oxide》

The method of manufacturing a negative electrode material in the present embodiment may further include adhering second metal oxide 122 to the outer surface of graphite particle 110. Second metal oxide 122 is an insulator. Second metal oxide 122 may be an insulator and ferroelectric. Details of second metal oxide 122 are as described previously. Metal oxide 122 may be at least one selected from the group consisting of $Al_2O_3$, $SiO_2$, and $BaTiO_3$.

A method of adhering second metal oxide 122 to the outer surface of graphite particle 110 should not particularly be limited, however, a method which is not likely to allow second metal oxide 122 to permeate into open pore 111 is desirable. For example, second metal oxide 122 may adhere to the outer surface of graphite particle 110 through mechanical milling with the use of a ball mill or an attritor. For example, nanoparticles (second metal oxide 122) may adhere to the surface of graphite particle 110 by immersing graphite particles 110 in a nanoparticle dispersion liquid. Nanoparticles refer to particles having d50 not smaller than 1 nm and not greater than 100 nm.

Second metal oxide 122 can be, for example, not smaller than 0.1 part by mass and not greater than 3 parts by mass with respect to 100 parts by mass of graphite particle 110.

Negative electrode material 100 can be manufactured as set forth above.

<Lithium Ion Secondary Battery>

Figure 3:
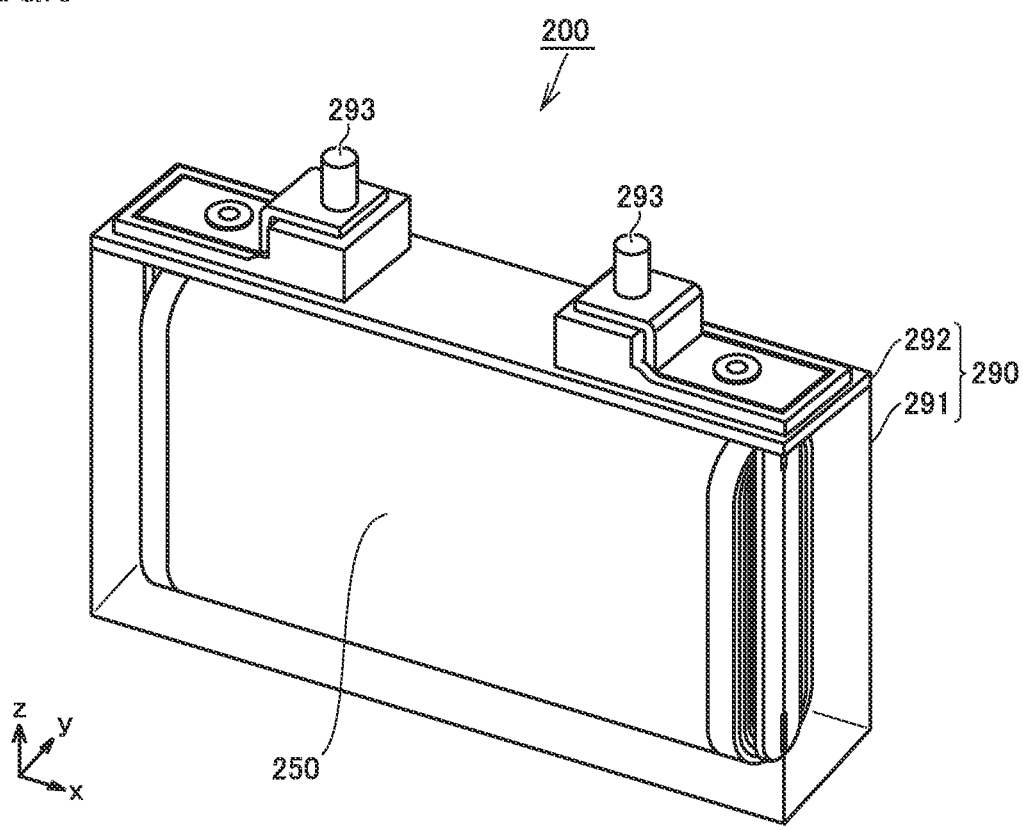
FIG. 3 is a schematic diagram showing one example of a construction of a lithium ion secondary battery in the present embodiment.

FIG. 3 is a schematic diagram showing one example of a construction of a lithium ion secondary battery in the present embodiment.

The lithium ion secondary battery can be abbreviated as a "battery" below. A battery 200 includes a case 290. Case 290 is in a prismatic shape (a parallelepiped of a flat profile). Naturally, the case may be, for example, in a cylindrical shape.

Case 290 includes a container 291 and a lid 292. Lid 292 is joined to container 291, for example, with laser welding. Case 290 is hermetically sealed. Case 290 is made, for example, of an aluminum (Al) alloy. So long as the case is hermetically sealed, the case may be a pouch made of an Al laminated film. The battery of the present embodiment may be a laminate-type battery. An external terminal 293 is provided in lid 292. Lid 292 may be provided with a current interrupt device (CID), a gas exhaust valve, and a liquid introduction port.

Case 290 accommodates an electrode group 250 and an electrolyte. Electrode group 250 is electrically connected to external terminal 293. An electrolyte is present in a cavity in electrode group 250.

Figure 4:
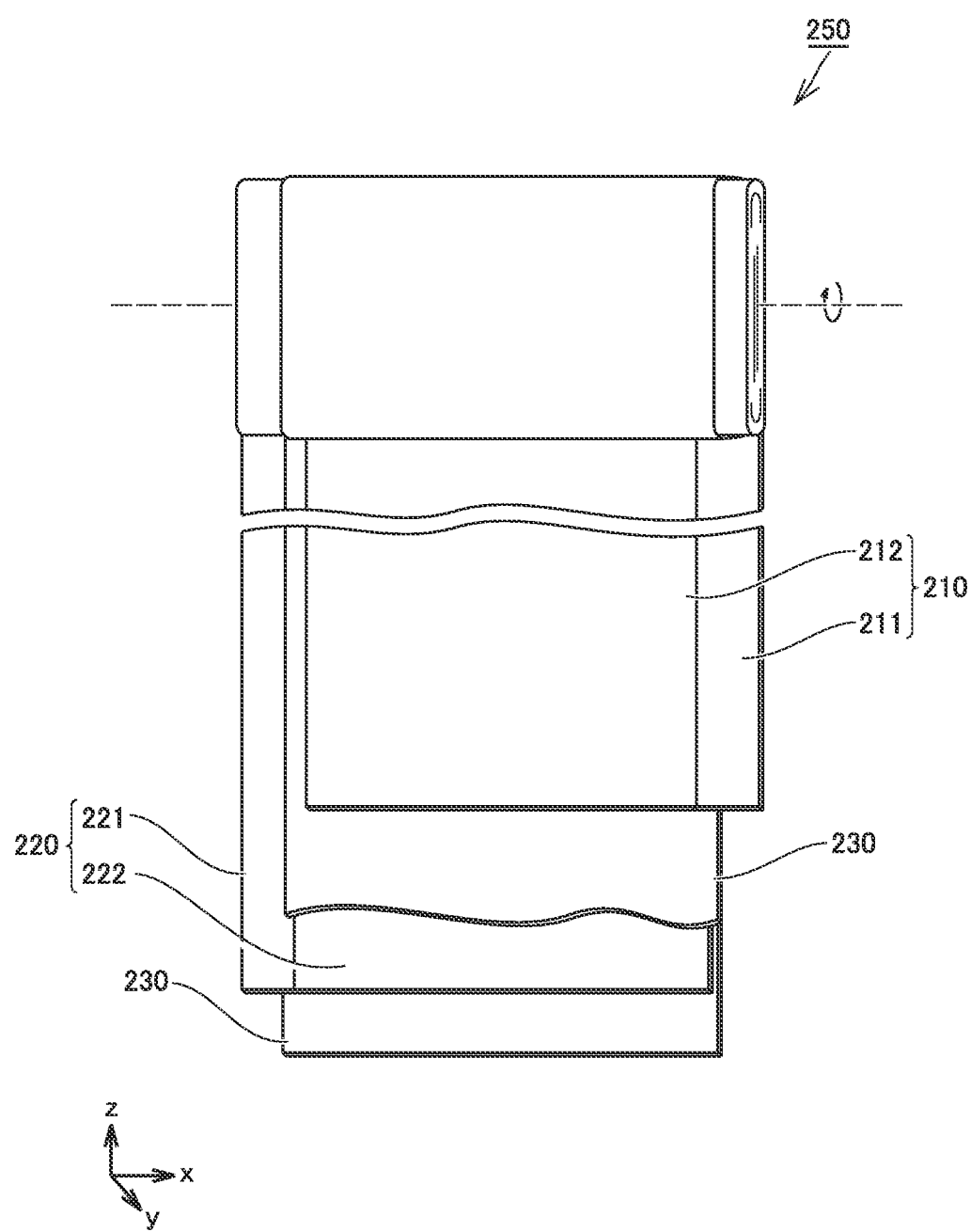
FIG. 4 is a schematic diagram showing one example of a construction of an electrode group in the present embodiment.

FIG. 4 is a schematic diagram showing one example of a construction of the electrode group in the present embodiment.

Electrode group 250 is of a wound type. Electrode group 250 is formed by stacking a positive electrode 210, a separator 230, negative electrode 220, and separator 230 in this order and further spirally winding the same. The electrode group may naturally of a stack (layered) type. The electrode group of the stack type can be formed by alternately stacking the positive electrode and the negative electrode. The separator is arranged between the positive electrode and the negative electrode.

«Negative Electrode»

Negative electrode 220 in the present embodiment is a sheet in a form of a band. Negative electrode 220 includes a negative electrode current collector 221 and negative electrode composite material layer 222. Negative electrode current collector 221 may be, for example, a copper (Cu) foil. Negative electrode current collector 221 may have a thickness, for example, not smaller than 5 μm and not greater than 50 μm.

A thickness of each feature in the present embodiment (for example, a thickness of negative electrode current collector 221 and negative electrode composite material layer 222) can be measured, for example, with a micrometer. A thickness may be measured in a cross-sectional micrograph of each feature. A thickness is measured at at least three locations. An arithmetic mean resulting from measurement at at least three locations is adopted as a measurement result.

Negative electrode composite material layer 222 is formed on a surface of negative electrode current collector 221. Negative electrode composite material layer 222 may be formed on both of front and rear surfaces of negative electrode current collector 221. Negative electrode composite material layer 222 may have a thickness, for example, not smaller than 10 μm and not greater than 200 μm.

Negative electrode composite material layer 222 contains at least negative electrode material 100 in the present embodiment. Namely, battery 200 contains at least negative electrode material 100 in the present embodiment. Negative electrode composite material layer 222 may further contain a binder. The binder should not particularly be limited. The binder may be, for example, carboxymethyl cellulose (CMC) and styrene-butadiene rubber (SBR). The binder may be, for example, not smaller than 0.5 part by mass and not greater than 5 parts by mass with respect to 100 parts by mass of negative electrode material 100.

Negative electrode composite material layer 222 may further contain other negative electrode active materials so long as it contains negative electrode material 100 in the present embodiment. Examples of other negative electrode active materials include silicon, silicon oxide, a silicon-based alloy, tin, tin oxide, a tin-based alloy, or lithium titanate.

«Positive Electrode»

Positive electrode 210 in the present embodiment is a sheet in a form of a band. Positive electrode 210 includes a positive electrode current collector 211 and a positive electrode composite material layer 212. Positive electrode current collector 211 may be, for example, an Al foil. Positive electrode current collector 211 may have a thickness, for example, not smaller than 5 μm and not greater than 50 μm. Positive electrode composite material layer 212 is formed on a surface of positive electrode current collector 211. Positive electrode composite material layer 212 may be formed on both of front and rear surfaces of positive electrode current collector 211. Positive electrode composite material layer 212 may have a thickness, for example, not smaller than 10 μm and not greater than 200 μm.

Positive electrode composite material layer 212 may contain, for example, at least 80 mass % and at most 98 mass % of a positive electrode active material, at least 1 mass % and at most 10 mass % of a conductive material, and a binder as the remainder. The positive electrode active material should not particularly be limited. The positive electrode active material may be, for example, $LiCoO_2$, $LiNiO_2$, $LiMnO_2$, $LiMn_2O_4$, $Li(Ni, Co, Mn)O_2$ [for example, $LiNi_{1/3}Co_{1/3}Mn_{1/3}O_2$], $LiNi_{0.8}Co_{0.15}Al_{0.05}$, or $LiFePO_4$. One type of positive electrode active material may be used alone. Two or more types of positive electrode active materials may be used as being combined. The conductive material should not particularly be limited. The conductive material may be, for example, acetylene black (AB). The binder should not particularly be limited. The binder may be, for example, polyvinylidene difluoride (PVdF).

«Separator»

Separator 230 in the present embodiment is a film in a form of a band. Separator 230 may have a thickness, for example, not smaller than 5 μm and not greater than 50 μm. Separator 230 is porous. Separator 230 is insulating. Separator 230 may be composed, for example, of polyethylene (PE) or polypropylene (PP).

Separator 230 may have a single-layered structure. Separator 230 may be formed only of a porous film composed of PE. Separator 230 may have a multi-layered structure. Separator 230 may be formed, for example, by stacking a porous film composed of PP, a porous film composed of PE, and a porous film composed of PP in this order.

A heat-resistant layer may be formed on an outermost surface of separator 230. The heat-resistant layer may have a thickness, for example, not smaller than 1 μm and not greater than 8 μm. The heat-resistant layer contains, for example, ceramic particles and a binder. The ceramic particles may be composed, for example, of alumina or boehmite.

«Electrolyte»

The electrolyte in the present embodiment may be, for example, a liquid electrolyte. The electrolyte may be a gel electrolyte or a solid electrolyte. The liquid electrolyte may be, for example, an electrolyte solution or an ionic liquid. An electrolyte solution is described in the present embodiment by way of example.

An electrolyte solution contains a solvent and Li salt. The Li salt is supporting salt. The Li salt is dissolved in the solvent. The electrolyte solution may contain, for example, at least 0.5 mol/l and at most 2 mol/l of Li salt. The Li salt may be, for example, $LiPF_6$, $LiBF_4$, $Li[N(FSO_2)_2]$, or $Li[N(CF_3SO_2)_2]$. One type of Li salt may be used alone. Two or more types of Li salt may be used as being combined.

The solvent may be, for example, a mixed solvent of cyclic carbonate and chain carbonate. A ratio of mixing may be set, for example, to cyclic carbonate/chain carbonate=1/9 to 5/5 (at a volume ratio). Cyclic carbonate may be, for example, ethylene carbonate (EC), propylene carbonate (PC), butylene carbonate (BC), or fluoroethylene carbonate (FEC). One type of cyclic carbonate may be used alone. Two or more types of cyclic carbonate may be used as being combined.

Chain carbonate may be, for example, dimethyl carbonate (DMC), ethyl methyl carbonate (EMC), or diethyl carbonate (DEC). One type of chain carbonate may be used alone. Two or more types of chain carbonate may be used as being combined.

The solvent may include, for example, lactone, cyclic ether, chain ether, and carboxylate. Lactone may be, for example, γ-butyrolactone (GBL) or δ-valerolactone. Cyclic ether may be, for example, tetrahydrofuran (THE), 1,3-dioxolane, or 1,4-dioxane. Chain ether may be 1,2-dimethoxyethane (DME). Carboxylate may be, for example, methyl formate (ME), methyl acetate (MA), or methyl propionate (MP).

The electrolyte solution may further contain various functional additives in addition to the solvent and the Li salt. The electrolyte solution may contain, for example, at least 1 mass % and at most 5 mass % of functional additive. Examples of the functional additive include a gas generating agent (what is called an overcharge additive) and a solid electrolyte interface (SEI) film forming agent. The gas generating agent may be, for example, cyclohexylbenzene (CHB) or biphenyl (BP). The SEI film forming agent may be, for example, vinylene carbonate (VC), vinyl ethylene carbonate (VEC), $Li[B(C_2O_4)_2]$, $LiPO_2F_2$, propane sultone (PS), or ethylene sulfite (ES). One type of functional additive alone may be used. Two or more types of functional additives as being combined may be used.

<Application of Lithium Ion Secondary Battery>

Battery 200 in the present embodiment is suitable, for example, for applications where a high current is applied for a long period of time. Such applications include, for example, a power supply for driving for a hybrid vehicle (HV), a plug-in hybrid vehicle (PHV), an electric vehicle (EV), and the like. Applications of battery 200 in the present embodiment should not be limited to car-mounted applications. Battery 200 in the present embodiment can be applied to each and every application.

EXAMPLES

Examples of the present disclosure will be described below. The description below does not limit the scope of claims.

Example 1

1. Manufacturing of Negative Electrode Material 1-1. (A) Preparation of Graphite Particles Graphite particles 110 were prepared. Graphite particle 110 has a porosity of 13%. Graphite particle 110 has d50 of 10 μm.

1-2. (B) Precipitation of First Metal Oxide $Li_2WO_3$ was dispersed in ion exchanged water. A dispersion liquid was thus prepared. The dispersion liquid was heated to 50° C. As a result of dropping of 4 mol/l of muriatic acid into the dispersion liquid, pH of the dispersion liquid was adjusted to 0.5.

An autoclave was prepared. The autoclave has an inner volume of 300 ml. The dispersion liquid prepared as above and graphite particles 110 were introduced into the autoclave. An amount of introduction of the dispersion liquid and the graphite particles was adjusted such that a content of a target material ($WO_3$) was set to 3 parts by mass with respect to 100 parts by mass of graphite particles 110. The autoclave was hermetically sealed.

An oil bath was prepared. A temperature of the oil bath was set to 160° C. The autoclave was stored in the oil bath for three days. The autoclave was opened three days after. A solid was filtered out by suction filtration.

The solid which was filtered out was dispersed in ion exchanged water. A dispersion liquid was thus prepared. A solid was again filtered out from the dispersion liquid as a result of suction filtration. This operation was repeated until a filtrate became transparent.

The solid was finally dried at a reduced pressure at 100° C. The negative electrode material according to Example 1 was thus manufactured. A cross-sectional sample of the negative electrode material was prepared. Precipitation of first metal oxide 121 on the inner wall of open pore 111 of graphite particle 110 was confirmed with SEM-EDX. Namely, adhesion of first metal oxide 121 to the inner wall of open pore 111 was confirmed. It was confirmed with XRD that first metal oxide 121 was composed of $WO_3$. $WO_3$ is considered as lithium ion conductive and electron conductive.

2. Manufacturing of Lithium Ion Secondary Battery 2-1. Manufacturing of Negative Electrode Materials below were prepared.

Negative electrode material: the negative electrode material according to Example 1

Binder: CMC and SBR

Negative electrode current collector: Cu foil (a thickness of 10 μm)

A paste was prepared by mixing the negative electrode material, the binder, and the solvent. A ratio of mixing of solid contents was set to negative electrode material/CMC/SBR=100/0.5/0.5 (at a mass ratio). The paste was applied to surfaces (both of a front surface and a rear surface) of negative electrode current collector 221 and dried. Negative electrode composite material layer 222 was thus formed. Negative electrode composite material layer 222 was rolled. Negative electrode 220 was manufactured as set forth above.

2-2. Manufacturing of Positive Electrode

Materials below were prepared.

Positive electrode active material: $LiNi_{1/3}Co_{1/3}Mn_{1/3}O_2$

Conductive material: AB

Binder: PVdF

Positive electrode current collector: Al foil (a thickness of 15 μm)

A paste was prepared by mixing the positive electrode active material, the conductive material, the binder, and the solvent. A ratio of mixing of solid contents was set to positive electrode active material/conductive material/binder=92/5/3 (at a mass ratio). The paste was applied to surfaces (both of a front surface and a rear surface) of positive electrode current collector 211 and dried. Positive electrode composite material layer 212 was thus formed. Positive electrode composite material layer 212 was rolled. Positive electrode 210 was manufactured as set forth above.

Positive electrode composite material layer 212 has a width dimension of 100 mm. The width dimension represents a dimension in a direction of the x axis in FIG. 4.

2-3. Manufacturing of Separator

A substrate film (having a thickness of 24 μm) was prepared. The substrate film was formed by stacking a porous film composed of PP, a porous film composed of PE, and a porous film composed of PP in this order. A paste was prepared by mixing alumina, a binder, and a solvent. A heat-resistant layer was formed by applying the paste to a surface (one surface) of the substrate film and drying the paste. The heat-resistant layer had a thickness of 4 μm. Separator 230 was manufactured as set forth above.

2-4. Assembly

Electrode group 250 was formed by stacking positive electrode 210, separator 230, negative electrode 220, and separator 230 in this order and further spirally winding the same. Separator 230 was arranged such that the heat-resistant layer faced negative electrode 220.

Case 290 was prepared. Electrode group 250 was accommodated in case 290. Electrode group 250 was electrically connected to external terminal 293. An electrolyte solution containing ingredients below was prepared.

Li salt: $LiPF_6$ (1 mol/l)
Solvent: [EC/DMC/EMC=3/3/4 (at a volume ratio)]

The electrolyte solution was introduced into case 290. Case 290 was hermetically sealed. Battery 200 was manufactured as set forth above. Electrode group 250 was impregnated with the electrolyte solution by leaving battery 200 for a prescribed period. After leaving battery 200, the battery was charged by a prescribed amount. After charging, battery 200 was stored for a prescribed period in an environment at a temperature of 60° C. Battery 200 was thus set to an initial state.

Comparative Example 1

Battery 200 was manufactured as in Example 1 except for use of untreated graphite particles 110 (having a porosity of 39%) as a negative electrode material.

Examples 2 to 3 and Comparative Examples 2 and 3

The negative electrode material was manufactured and battery 200 was manufactured as in Example 1 except for use of graphite particles 110 having a porosity in Table 1 below.

Examples 4 to 6 and Comparative Examples 4 and 5

The negative electrode material was manufactured and the battery was manufactured as in Example 1 except for change in part by mass of first metal oxide 121 with respect to 100 parts by mass of graphite particles 110 as shown in Table 1 below.

Comparative Example 6

A negative electrode material (powders of untreated graphite particles 110) according to Comparative Example 1 and $Al_2O_3$ (powders) were mixed through mechanical milling. $Al_2O_3$ thus adhered to the outer surface of graphite particle 110. $Al_2O_3$ is an insulator. The negative electrode material according to Comparative Example 6 was thus manufactured. Battery 200 was manufactured as in Example 1 except for use of the negative electrode material.

Example 7

1-3. (C) Adhesion of Second Metal Oxide

The negative electrode material according to Example 2 and $Al_2O_3$ were mixed through mechanical milling. $Al_2O_3$ thus adhered to the outer surface of graphite particle 110. $Al_2O_3$ represents second metal oxide 122. The negative electrode material according to Example 7 was thus manufactured. A content of second metal oxide 122 was 0.1 part by mass with respect to 100 parts by mass of graphite particles 110. Battery 200 was manufactured as in Example 1 except for use of the negative electrode material.

Examples 8 and 9

The negative electrode material was manufactured and battery 200 was manufactured as in Example 7 except for change in part by mass of $Al_2O_3$ as shown in Table 1 below.

Example 10

The negative electrode material was manufactured and battery 200 was manufactured as in Example 9 except for change from $Al_2O_3$ to $BaTiO_3$. $BaTiO_3$ is a ferroelectric.

Example 11

The negative electrode material was manufactured and battery 200 was manufactured as in Example 9 except for change from $Al_2O_3$ to $SiO_2$. $SiO_2$ is an insulator.

<Evaluation>

«Powder Resistivity»

A powder resistivity measurement system (a trademark "MCP-PD51" manufactured by Mitsubishi Chemical Analytech Co., Ltd.) and a resistivity meter (a trademark "Loresta GP" manufactured by Mitsubishi Chemical Analytech Co., Ltd.) were prepared. Five grams of negative electrode material were weighed. A sample chamber of the powder resistivity measurement system was filled with the negative electrode material. A load of 20 kN was applied to the negative electrode material. A resistivity (powder resistivity) was measured with the load being applied. A value shown in the field of "powder resistivity" in Table 1 below is a relative value with powder resistivity in Comparative Example 1 being defined as 100. It is considered that electron conductivity of the negative electrode material is higher as the value is smaller.

«Current Applying Resistance»

A state of charge (SOC) of battery 200 was adjusted to 56%. Battery 200 was charged with a prescribed current in an environment at a temperature of −10° C. Increase in voltage (ΔV) thirty seconds after start of charging was measured. A current applying resistance was calculated by dividing the increase in voltage by the current. A value shown in the field of "current applying resistance" in Table 1 below is a relative value with a current applying resistance in Comparative Example 1 being defined as 100. It is considered that a current applying resistance is lower as the value is smaller.

«Li Precipitation Resistance»

In an environment at a temperature of 25° C., a rated capacity (initial discharging capacity) of battery 200 was measured by performing charging and discharging with a constant voltage-constant current method. After the rated capacity was measured, the SOC of battery 200 was adjusted to 56%. With a sequence of "charging, rest, discharging, and rest" below being defined as one cycle, one thousand cycles were performed. A current rate at "20C" discharges the rated capacity in three minutes.

Charging: current rate of 20 C and time period for charging of 30 seconds
Rest: ten minutes
Discharging: current rate of 20 C and time period for discharging of 30 seconds
Rest: ten minutes After 1000 cycles, a post-cycle discharging capacity was measured as in measurement of the rated capacity. A capacity retention was calculated by dividing the post-cycle capacity by the rated capacity. A value shown in the field of "Li precipitation resistance" in Table 1 below is a relative value with a capacity retention in Comparative Example 1 being defined as 100. It is considered that precipitation of Li is further suppressed (resistance to precipitation of Li is higher) as the value is greater.

graphite particle 110 had a porosity exceeding 66%, graphite particle 110 broke at the time of compression of negative electrode composite material layer 222.

An amount of lowering in current applying resistance is small in Comparative Example 4. This may be because of a low content of first metal oxide 121.

A current applying resistance increased in Comparative Example 5 to the contrary. It is considered that an effective reaction area decreased because a content of the first metal oxide was excessively high.

Adhesion of second metal oxide 122 (insulator) to the outer surface of graphite particle 110 without containing first metal oxide 121 therein simply leads to increase in current applying resistance (Comparative Examples 1 and 6). In contrast, by adhering second metal oxide 122 to the outer surface of graphite particle 110 containing first metal oxide 121 therein, precipitation of Li tends to be suppressed while a current applying resistance is maintained low (Examples 2 and 7 to 11). This may be because of improved balance

TABLE 1

List of Examples and Comparative Examples

| | Negative Electrode Material | | | | Evaluation | | |
| --- | --- | --- | --- | --- | --- | --- | --- |
| | Graphite | First Metal Oxide | | Second Metal Oxide | | | Current | Li |
| | Particle Porosity [%] | Type | Content [Part by Mass] | Type | Content [Part by Mass] | Powder Resistivity [—] | Applying Resistance [—] | Precipitation Resistance [—] |
| Comparative Example 1 | 39 | — | 0 | — | 0 | 100 | 100 | 100 |
| Comparative Example 2 | 6 | $WO_3$ | 3 | — | 0 | 95 | 101 | 99 |
| Example 1 | 13 | $WO_3$ | 3 | — | 0 | 90 | 96 | 103 |
| Example 2 | 39 | $WO_3$ | 3 | — | 0 | 91 | 92 | 103 |
| Example 3 | 66 | $WO_3$ | 3 | — | 0 | 89 | 94 | 104 |
| Comparative Example 3 | 72 | $WO_3$ | 3 | — | 0 | 97 | 99 | 99 |
| Comparative Example 4 | 39 | $WO_3$ | 0.1 | — | 0 | 99 | 99 | 100 |
| Example 4 | 39 | $WO_3$ | 0.5 | — | 0 | 95 | 96 | 103 |
| Example 5 | 39 | $WO_3$ | 5 | — | 0 | 94 | 93 | 104 |
| Example 6 | 39 | $WO_3$ | 20 | — | 0 | 94 | 94 | 104 |
| Comparative Example 5 | 39 | $WO_3$ | 25 | — | 0 | 96 | 101 | 99 |
| Comparative Example 6 | 39 | — | 0 | $Al_2O_3$ | 3 | 110 | 102 | 103 |
| Example 7 | 39 | $WO_3$ | 3 | $Al_2O_3$ | 0.1 | 97 | 95 | 103 |
| Example 8 | 39 | $WO_3$ | 3 | $Al_2O_3$ | 0.5 | 98 | 94 | 108 |
| Example 9 | 39 | $WO_3$ | 3 | $Al_2O_3$ | 3 | 100 | 95 | 110 |
| Example 10 | 39 | $WO_3$ | 3 | $BaTiO_3$ | 3 | 100 | 90 | 109 |
| Example 11 | 39 | $WO_3$ | 3 | $SiO_2$ | 3 | 102 | 95 | 108 |

<Results>

In Examples, graphite particle 110 has a porosity not lower than 13% and not higher than 66%. Examples are lower in current applying resistance than Comparative Example 1. It is considered that, since $WO_3$ adhered to the inner wall of open pore 111 in Examples, diffusion of Li ions into the inside of graphite particle 110 was promoted.

Lowering in current applying resistance is not observed in Comparative Example 2. It is considered that, since a porosity of graphite particle 110 was lower than 13%, $WO_3$ was not precipitated on the inner wall of open pore 111 and $WO_3$ adhered substantially only to the outer surface of graphite particle 110.

An amount of lowering in current applying resistance is small in Comparative Example 3. It is considered that, since between lithium ion conductivity and electron conductivity in negative electrode composite material layer 222.

A tendency of lowering in current applying resistance is observed as a result of second metal oxide 122 being a ferroelectric (Examples 2 and 9 to 11). This may be because of promotion of acceptance of Li ions owing to dielectric polarization of the ferroelectric.

The embodiment and Examples disclosed herein are illustrative and non-restrictive in every respect. The technical scope defined by the terms of the claims includes any modifications within the scope and meaning equivalent to the terms of the claims.

What is claimed is:

1. A negative electrode material for a lithium ion secondary battery comprising at least:
   a graphite particle; and
   a first metal oxide,
   the graphite particle including at least one open pore,
   the graphite particle having a porosity not lower than 13% and not higher than 66%,
   the first metal oxide being lithium ion conductive and electron conductive,
   the first metal oxide being in the form of a film adhering to an inner wall of the at least one open pore and extending continuously within the at least one open pore, and being configured to facilitate diffusion of Li ions into an inside of the graphite particle,
   the first metal oxide being not smaller than 0.5 part by mass and not greater than 20 parts by mass with respect to 100 parts by mass of the graphite particle, and
   the negative electrode material further comprising a second metal oxide; wherein
   the second metal oxide is an insulator,
   the second metal oxide adheres to an outer surface of the graphite particle, and
   the first metal oxide is tungsten oxide (VI).

2. The negative electrode material according to claim 1, wherein
   the second metal oxide is a ferroelectric.

3. The negative electrode material according to claim 1, wherein
   the second metal oxide is at least one selected from the group consisting of aluminum oxide (III), silicon dioxide, and barium titanate.

4. A lithium ion secondary battery comprising at least the negative electrode material according to claim 1.

5. A method of manufacturing a negative electrode material for a lithium ion secondary battery comprising at least:
   preparing graphite particles each including at least one open pore; and
   precipitating a first metal oxide on an inner wall of the at least one open pore with a hydrothermal technique,
   the first metal oxide being in the form of a film that extends continuously within the at least one open pore and being configured to facilitate diffusion of Li ions into an inside of the graphite particle,
   the graphite particle having a porosity not lower than 13% and not higher than 66%,
   the first metal oxide being lithium ion conductive and electron conductive,
   the first metal oxide being not smaller than 0.5 part by mass and not greater than 20 parts by mass with respect to 100 parts by mass of the graphite particles, and
   the method further comprising adhering a second metal oxide to an outer surface of the graphite particle; wherein
   the second metal oxide is an insulator,
   the second metal oxide adheres to an outer surface of the graphite particle, and
   the first metal oxide is tungsten oxide (VI).

6. The method of manufacturing a negative electrode material according to claim 5, wherein
   the second metal oxide is a ferroelectric.

7. The method of manufacturing a negative electrode material according to claim 5, wherein
   the hydrothermal technique comprises:
      preparing a dispersion liquid of the first metal oxide and the graphite particles;
      introducing the dispersion liquid into an autoclave;
      hermetically sealing the autoclave with the dispersion liquid contained therein;
      placing the hermetically sealed autoclave in an oil bath; and
      heating the oil bath with the hermetically sealed autoclave disposed therein to a temperature of 140° C. to 180° C.

8. The method of manufacturing a negative electrode material according to claim 7, further comprising, prior to introducing the dispersion liquid into the autoclave, lowering the pH of the dispersion liquid by adding an inorganic acid.

9. The method of manufacturing a negative electrode material according to claim 7, wherein the pH of the dispersion liquid is 0.4 to 0.6.

10. The method of manufacturing a negative electrode material according to claim 7, wherein the oil bath having the autoclave disposed therein is maintained at the temperature of 140° C. to 180° C. for a time period of at least one day.

11. The method of manufacturing a negative electrode material according to claim 7, wherein the oil bath having the autoclave disposed therein is maintained at the temperature of 140° C. to 180° C. for a time period of one to five days.

12. The method of manufacturing a negative electrode material according to claim 5, wherein
   the hydrothermal technique comprises precipitating the first metal oxide on the inner wall of the open pore at a temperature of 140° C. to 180° C. and at a pressure of 2 MPa to 10 MPa.

13. The method of manufacturing a negative electrode material according to claim 5, wherein
   the hydrothermal technique comprises precipitating the first metal oxide on the inner wall of the open pore by maintaining a dispersion liquid of the first metal oxide and the graphite particles at a temperature of 140° C. to 180° C. and at a pressure of 2 MPa to 10 MPa for a time period of at least one day.

14. The method of manufacturing a negative electrode material according to claim 5, wherein
   the hydrothermal technique comprises precipitating the first metal oxide on the inner wall of the open pore by maintaining a dispersion liquid of the first metal oxide and the graphite particles at a temperature of 140° C. to 180° C. and at a pressure of 2 MPa to 10 MPa for a time period of one to five days.

15. The negative electrode material according to claim 3, wherein
   the second metal oxide is not smaller than 0.1 part by mass and not greater than 3 parts by mass with respect to 100 parts by mass of graphite particle.

16. The negative electrode material according to claim 1, wherein
   the second metal oxide adheres only to the outer surface of the graphite particle.

17. The method of manufacturing a negative electrode material according to claim 5, wherein
   the second metal oxide adheres only to the outer surface of the graphite particle.

18. The method of manufacturing a negative electrode material according to claim 5, wherein
   adhering the second metal oxide to the outer surface of the graphite particle comprises mechanical milling.

19. The method of manufacturing a negative electrode material according to claim 5, wherein
adhering the second metal oxide to the outer surface of the graphite particle comprises immersing the graphite particles in a dispersion liquid including particles of the second metal oxide.

* * * * *